United States Patent [19]

Beningo

[11] Patent Number: 4,880,454
[45] Date of Patent: Nov. 14, 1989

[54] SYSTEM AND METHOD FOR APPLYING LUBRICANT TO CHARGES OF MOLTEN GLASS

[75] Inventor: Joseph A. Beningo, DuBois, Pa.

[73] Assignee: O-I Brockway Glass, Inc., Toledo, Ohio

[21] Appl. No.: 305,058

[22] Filed: Feb. 2, 1989

[51] Int. Cl.$^4$ .............................................. C03B 40/02
[52] U.S. Cl. ........................................ 65/24; 65/25.1; 65/169
[58] Field of Search .................. 65/24, 25.1, 60.6, 169

[56] References Cited

U.S. PATENT DOCUMENTS

| | | | |
|---|---|---|---|
| 3,672,860 | 6/1972 | Keller | 65/24 X |
| 4,526,600 | 7/1985 | Myers | 65/24 |
| 4,806,137 | 2/1989 | Virey | 65/24 X |

Primary Examiner—Arthur Kellogg

[57] ABSTRACT

A system for lubricating glass forming molds and guide members by flame spraying the molten gobs of glass as they fall to the molds with powdered graphite where the graphite spray is directed from two sides of the falling gob or gobs. Any overspray that does not impinge on the gob or adhere to the gob during the flame spraying of the lubricant is collected by positioning an exhaust header in direct alignment with the flame spray direction to draw the combustion products and powdered lubricant overspray into an exhaust system to keep the area around the feeder clean and free of airborne particles.

The mounting of the burners and exhaust headers on a support which is movable relative to the gob drop path without actually crossing the path facilitates the implementation of the lubricant system of the invention.

4 Claims, 4 Drawing Sheets

SYSTEM AND METHOD FOR APPLYING LUBRICANT TO CHARGES OF MOLTEN GLASS

BACKGROUND OF THE INVENTION

The present invention is directed to the lubrication mold charge delivery systems and molds for forming glass objects from charges of molten glass.

In the manufacture of glass articles, such as glass containers, molten glass charges fed from a glass feeder are delivered to a parison or pre-form mold where the viscous charge is formed into the shape of a parison. The parison is then transferred to a final shaping mold where the parison is expanded into its final shape. It is known in the art of lass forming that the presence of a lubricant in the parison mold is desirable to overcome the adherent quality of the viscous glass and to allow the molten glass to slide relative to the mold surface. Further, lubricants have been used in the delivery systems for molten charges to reduce the frictional engagement of the molten charge with scoops and troughs which guide the charge from the feeder to the mold.

Traditionally the molds were lubricated with a carbonaceous liquid termed "mold dope". This "mold dope" was not always of uniform quality and many machine operators had their own concepts as to what should be included in the "mold dope". The "mold dope" was added to the mold by the insertion of a brush which had been dipped in the dope into the hot mold. This procedure also was characterized as "swabbing" the molds. The frequency of the swabbing was not a precise factor, but was usually left to the operator whose prime concern was to prevent the glass from sticking to the mold, either on entry as a gob or after shaping into a parison. Thus, swabbing was considered an "art" by the machine operators but typically the first ware produced after swabbing would have to be discarded because of defects.

Alternatively, semi-permanent mold coatings were used to provide the requisite lubrication in the molds; however, in time these coatings have to be reapplied.

A recently issued U.S. Pat. No. 4,526,600, issued to Myers, discloses a method for the lubrication of delivery equipment and molds for producing glass articles. This patent teaches the application of a lubricant to the viscous glass prior to its contact with the delivery equipment and/or prior to the introduction of the glass charge into the mold. The lubricant is applied to the glass at a location in the forming process which is prior to contact with the delivery equipment and/or molds. The lubrication means employed by the patentee were of the type where the mold charge or gob of molten glass either passed through the device, as shown in FIGS. 1, 5 and 6; or in the preferred embodiment of FIG. 2, the lubricant, in the form of a powder (e.g., powdered graphite), is applied to the glass gob by means of a flame spray lubrication means. The powdered graphite is introduced into the nozzle of a burner together with combustion gases for a flame. A plurality of burners aimed radially inward were symmetrically disposed around the coating zone. Three burners at 120° intervals were suggested.

The suggested lubricants were powdered graphite, powdered inorganic salts such as sodium or potassium sulfate. The coating of the glass gob eliminates the need for specifically lubricating the interior of the mold or the delivery equipment since the lubricant will be transferred from the gob or charge to the surface of the delivery equipment and mold.

The term delivery equipment is intended to encompass gob chutes, funnels, guides, troughs or other charge directing or shaping members that are employed in guiding gobs by physical contact therewith during normal free fall of the gobs from the feeder to the molds.

"Molds" are intended to include any forming member in which the glass gob is received and in which the shape thereof is transformed while therein.

One problem encountered with employing the method of U.S. Pat. No. 4,526,600 was that the formation of mold charges would need to be discontinued in order for the equipment to be set up in surrounding relationship to the path of drop of the mold charges or the charges would have to be intercepted from the path and sent to a discharge chute. In either event, the operation of the forming process would be discontinued during the installation or implementation of the process of flame spraying graphite powder on the mold charges. When a process that involves hot glass is interrupted, the system requires a start-up time when resumed.

SUMMARY AND OBJECTS OF THE PRESENT INVENTION

It is an object of the present invention to provide a mold lubrication system that treats mold charges or gobs without requiring any interruption of the gob delivery to the molds to implement the system.

It is a further object of the present invention to provide a gob lubrication system that can be introduced into the gob delivery system without disturbing the feeding of gobs to the molds.

A further object of the present invention is to provide a system which sprays the falling gobs of molten glass with a lubricant while preventing the overspray from the system from being entrained in the atmosphere surrounding the lubrication system.

It is a still further object of the invention to provide a novel gob spray system which directs spray at plural sides of the gobs and collects any overspray that passes by the gobs during the spraying.

In accordance with the present invention, gobs of glass, or mold charges, are severed from a feeder and are sprayed with a lubricant by a mechanism that may be extended or retracted from its spraying position adjacent the path of travel of the gobs to the molds. The lubricating apparatus is shiftable into position where a spray head is positioned on one side of the gob path and a vacuum chamber is positioned on the opposite side to gather any overspray.

In accordance with the present invention, there will be at least two lubricant spray devices for each gob path in order to cover the circumference of the gob and when plural gobs are being simultaneously fed, as is the case in a multiple gob delivery system, a vacuum system will be provided opposite the spray head or set of spray heads to capture the overspray and convey it away from the area where spraying is occurring.

DETAILED DESCRIPTION OF THE INVENTION

As described in U.S. Pat. No. 4,526,600 issued July 2, 1985 to Ronald T. Myers, it is advantageous to lubricate delivery equipment and molds used in producing glass articles. The method described in the Myers patent is to coat at least a portion of the molten glass gobs used to form the articles with a lubricant as the gob is traveling to the handling equipment or prior to entry into the forming mold.

A particular system for coating the gobs with a powder lubricant is in the form of a lame spray lubrication device having a burner nozzle into which powdered graphite is introduced with combustion gas for producing the flame. The burner is positioned so that the outer cone of the flame will impinge on the exterior of the glass gob as it falls from the feeder. The graphite powder which is fed to the interior of the flame will contact the glass and adhere thereto by means of an electrical charge accumulated by the graphite particles as it passes through the flame.

The foregoing process is to be accomplished by the present invention which relates to the specific apparatus for applying the powdered lubricant in a flame spray system that will not require interruption of the glass gobbing to position the spray system in operative relationship to the feeder orifices. The mounting of the burner system of the invention is such that it may be placed in operative position whenever desired without disrupting the feeding of glass gobs or charges to the forming machine molds and without any overspray of the graphite particles.

Figure 1:
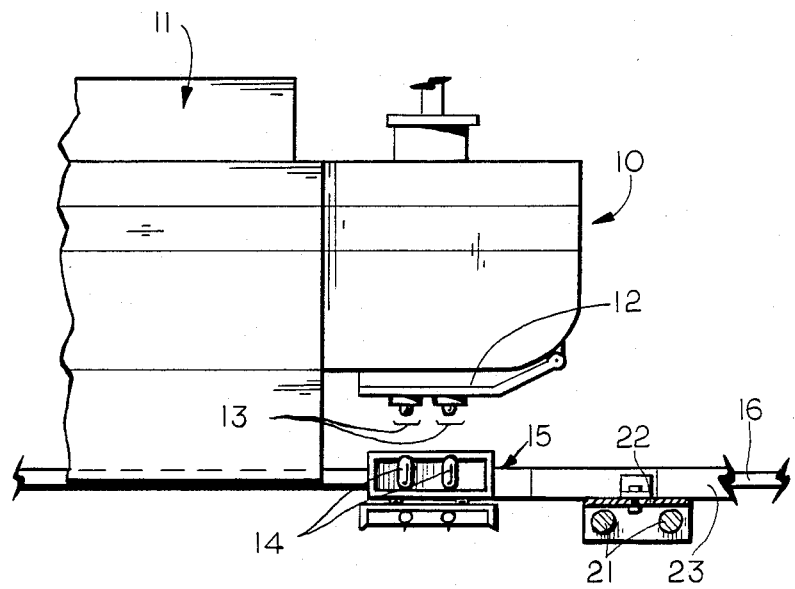
FIG. 1 is a schematic side elevational view of a double gob feeder with one-half of the spray mechanism of the invention.
Figure 2:
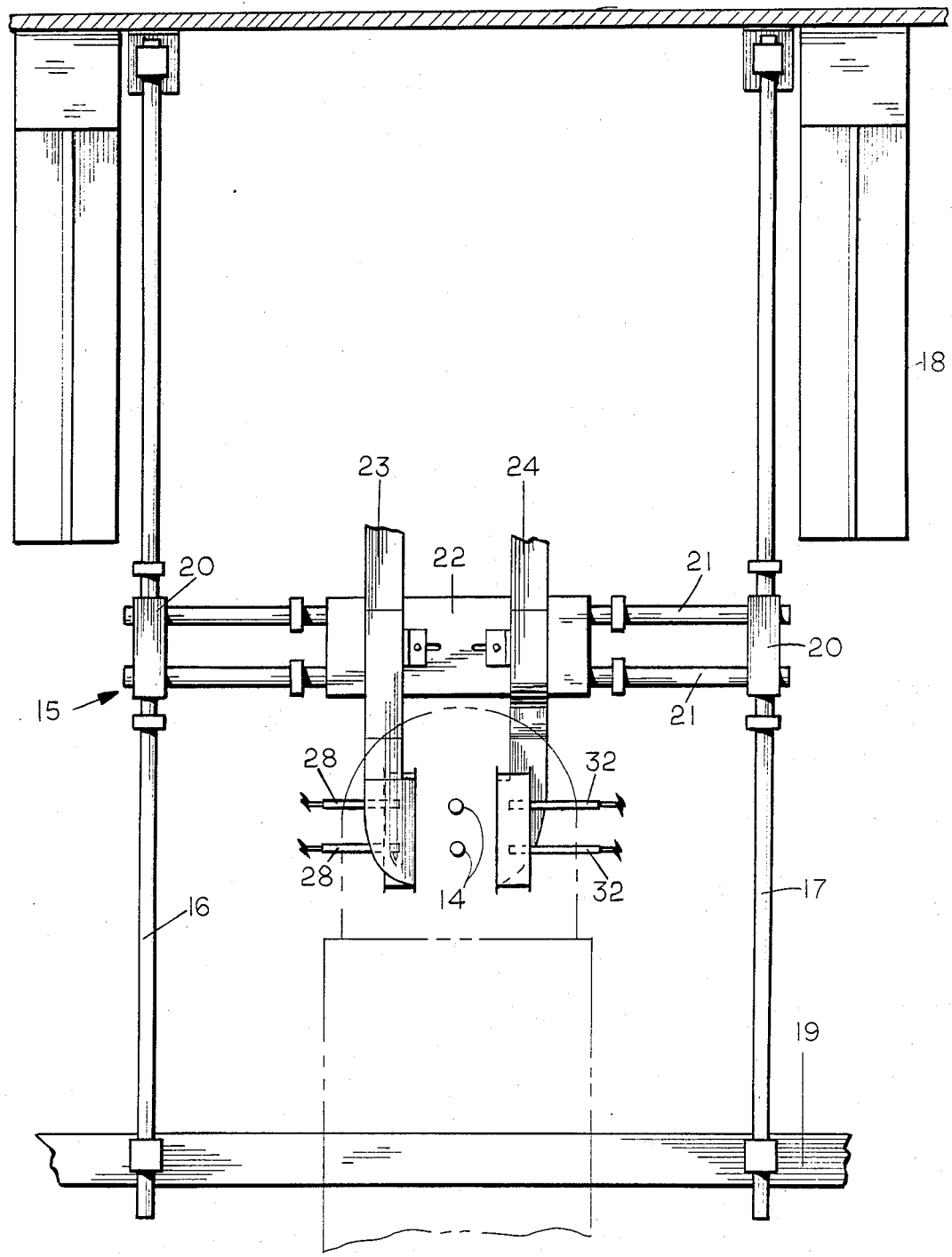
FIG. 2 is a schematic plan view of the double gob lubricating system of the invention.

As illustrated in FIG. 1, a molten glass feeder 10 is shown at the forward end of a forehearth 11. Beneath the feeder 10 is shown a double gob orifice structure 12 through which molten charges of glass will be fed. Beneath the orifice structure 12 is positioned shear mechanism 13 which will sever the two streams of glass issuing from the feeder into mold charges or gobs 14. The gobs 14 will fall by gravity into parison forming molds (not shown).

Immediately below the shear mechanism is positioned the lubricant spray system, generally designated 15, to which the present invention is directed.

The lubricant spray mechanism 15 is comprised of a pair of horizontal, spaced apart support rods 16 and 17 which are shown as having the ends supported from fixed supports 18 and 19 such as "I" beams and cross tie members in the glass plant.

Each of the rods 16 and 17 has a movable sleeve 20 carried thereby. The sleeves 20 each support the ends of a pair of cross rods 21. The cross rods 21 adjacent the center of their span support a generally horizontal platform 22. The platform 22 has an upper surface to which is mounted a pair of spaced apart vacuum ducts 23, 24. The ducts 23, 24 are mounted to the platform by angle brackets that in turn are adjustable mounted in slots formed in the platform.

Figure 3:
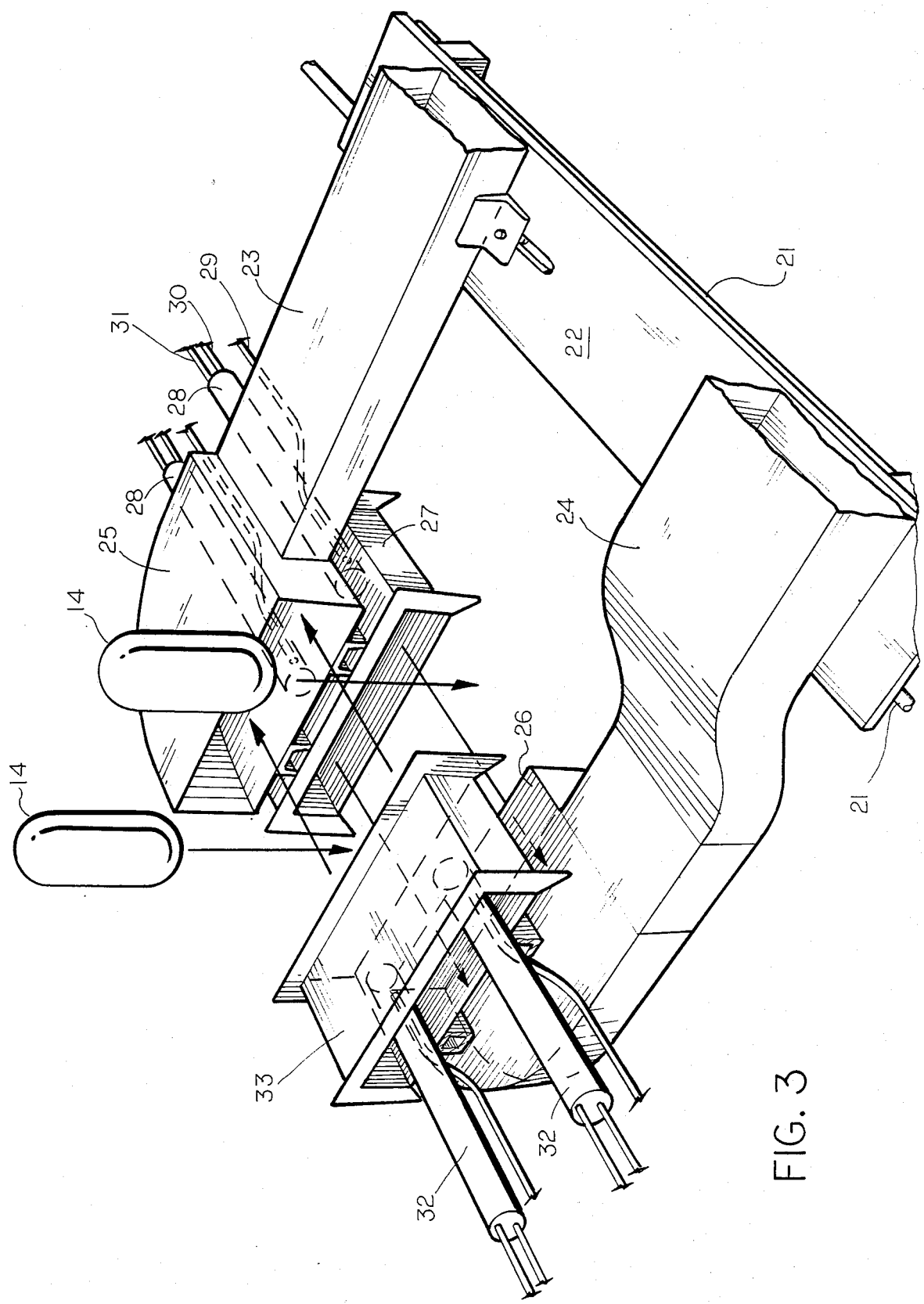
FIG. 3 is an enlarged perspective view of the gob lubricating spray heads of the invention.

As best shown in FIG. 3, the forward ends of the ducts are formed with right angle openings which face in the direction of the path of travel of the mold charges. The duct 23 has a header 25 which faces to the right in FIG. 3 while the duct 24 has a header 26 which faces to the left. Beneath the header 25 is mounted a generally rectangular spray gun support head 27. The head 27, as shown in FIG. 3, supports a pair of spaced apart burners 28. Each of the burners 28 is of the type disclosed and described in U.S. Pat. No. 4,526,600, referred to above in which powdered graphite is entrained in a natural gas burner. The powdered graphite or lubricant is being fed through a tube 29 to the interior of the burner nozzle 28. Natural gas methane or acetylene may be introduced through a feed pipe 30 with air being introduced through pipe 31, both of which open into the interior of the burner 28.

As the gas and air become mixed in the burner 28, a combustible flame is produced within the burner and the powdered graphite or mold lubricant becomes entrained within the flame. The flame will exit the front of the head 27 and impinge on the glass gob 14 that is passing vertically through the horizontal flame. There will be a flame that is exiting both burners 30 mounted in the head 27 and in a like manner there will be flames issuing from a pair of burners 32 which are mounted in a head 33. The head 33 is at the same vertical level as the open, exhaust header 25 while the burner support head 27 is at the same vertical height as the header 26. Thus, the flame from burners 28 will exhaust through the header 26 while the products of combustion and any excess powdered lubricant coming from the flames from burners 32 will be exhausted through the header 25.

Figure 4:
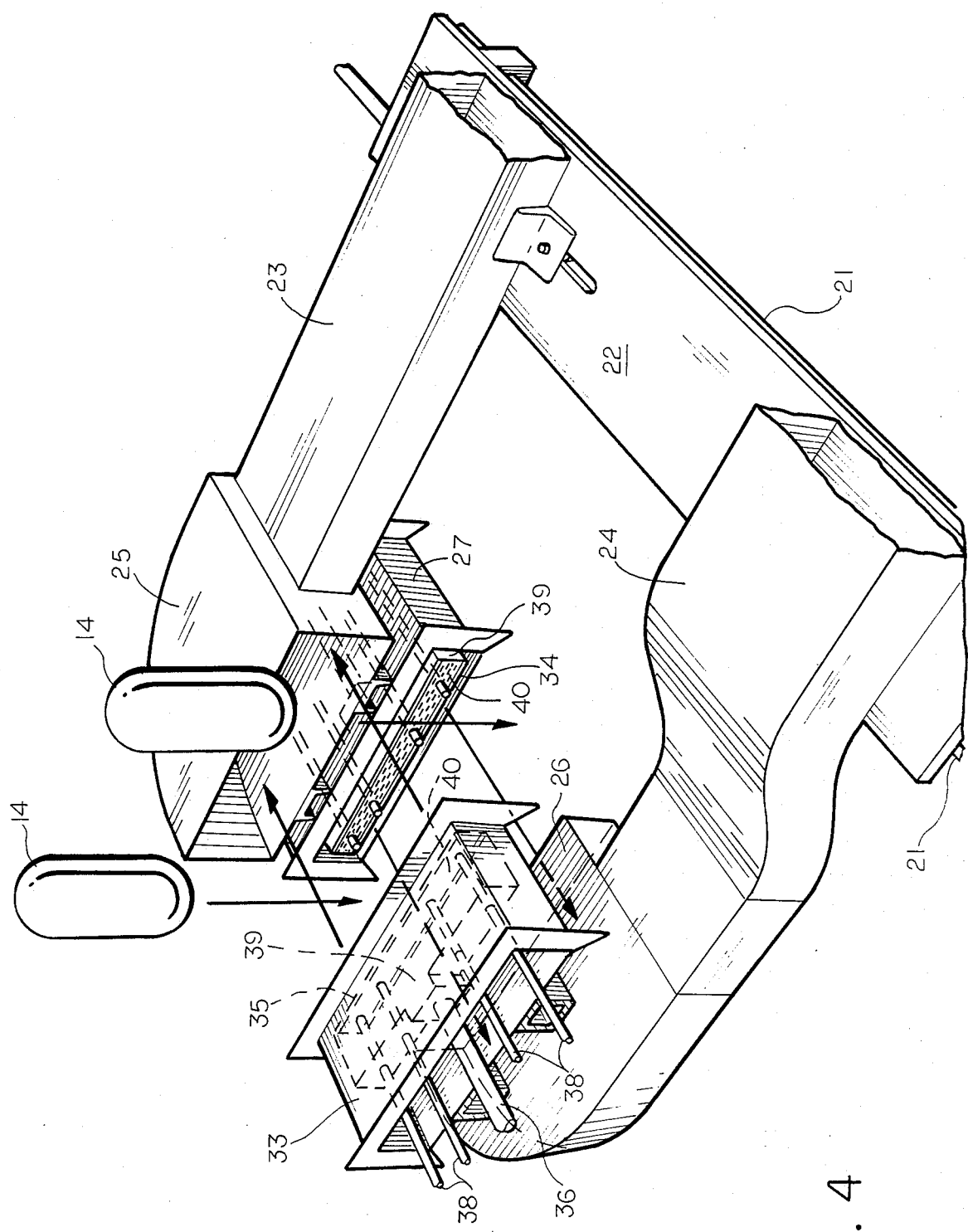
FIG. 4 is a perspective view of a second embodiment of the gob lubricating spray heads of the invention.

With reference to the preferred embodiment of FIG. 4, the same numerals are used for the parts that are common with the embodiment of FIG. 3. In this embodiment of the invention the burner heads 27 and 33 each support a single ribbon burner 34, 35 respectively. Each burner is connected to an air and combustible gas line 36 with supply pipes 38 extending through the interior of a mixing zone or chamber 39 in the burner 35. The chamber 39 is in the form of an elongated hollow rectangular chamber whose front is closed by an expanded metal screen 40. The lubricant powder is fed through the pipes 38 with air and becomes entrained in the air and gas mixture in front of the screen 40. This mixture is ignited and results in a wide flame being formed at the face 40 of the chamber 39. The flame is of sufficient width to impinge on both gobs simultaneously.

The lubricant powder being delivered through the pipes 38 will be directed from pairs of pipes 38 toward the side of each gob. Thus there are four pipes 38 extending through each burner when two gobs are being lubricated.

The identical burner assembly 35 provided in the head 33 will have its flame impinging on the gobs of glass from the opposite side. Thus it can be seen that both gobs are coated with graphite powder from the burners and the overspray is carried away by the vacuum headers 25 and 26.

With the foregoing system, it can be seen that any overspray of lubricant which does not become attached to the gobs 14 will be collected and conveyed to an exhaust system by the headers 25 and 26.

It can also be seen that since the burners and exhaust headers that are mounted on the support plate or platform 22 are relatively adjustable, the lubricant spray system may be adjusted to accommodate spacing of gobs and size of gobs with relative ease.

Further, since the platform 22 is movable relative to the side supporting rods 16 and 17, the burner and exhaust system may be shifted into and out of the operative position without disturbing the cutting of gobs and their being fed to the glass forming machines positioned therebelow.

While the burners 28 and 32 have been shown as opposed pairs, it should be apparent that if more or less than two gobs are being severed then additional or fewer pairs of burners may be provided so as to accommodate the flame spraying of lubricants on each gob.

Other modifications will be apparent to those skilled in the art without going beyond the scope of the claims annexed to this specification and forming a part thereof.

What is claimed is:

1. Apparatus for applying powdered graphite (lubricant) to glass gobs in free fall from a feeder, comprising first and second lubricant spray devices, said spray devices being mounted to a common support member with said devices extending horizontally outward, in parallel, from one side of said support member, said devices being in facing relationship and spaced apart an amount sufficient to permit the passage of a gob of glass therebetween when in operative position, a pair of exhaust headers associated with said spray devices, and mounting means for said support member for moving said support member into and out of position where the spray devices are directed to opposite sides of the free fall path of the gobs without crossing the free fall path of the gobs.

2. The apparatus of claim 1 where said exhaust headers are mounted to said common support member with a header in horizontal, opposed alignment with a lubricant spray device.

3. In the method of applying powdered mold lubricant to molten glass gobs in free fall from a feeder, wherein flame spray burners with entrained powdered lubricant are positioned to impinge their flames on opposite sides of the gobs, the improvement comprising evacuating the area on the opposite sides of each gob from the burner flame impingement to thereby collect and exhaust any combustion products or powdered lubricant that does not adhere to the gobs.

4. Apparatus for applying powdered graphite (lubricant) to glass gobs in free fall from a feeder, comprising first and second lubricant spray devices, said spray devices being mounted to a common support member with said devices extending horizontally outward, in parallel, from one side of said support member, said devices being in facing relationship and spaced apart an amount sufficient to permit the passage of a gob of glass therebetween when in operative position, exhaust means in alignment with each spray device for collecting any overspray of lubricant that passes a gob, and mounting means for said support member for moving said support member into and out of position where the spray devices are directed to opposite sides of the free fall path of the gobs without crossing the free fall path of the gobs.

* * * * *